United States Patent
Zhang et al.

(10) Patent No.: US 12,001,640 B2
(45) Date of Patent: Jun. 4, 2024

(54) TOUCH SUBSTRATE, METHOD FOR MANUFACTURING TOUCH SUBSTRATE AND DISPLAY APPARATUS

(71) Applicants: Hefei Xinsheng Optoelectronics Technology Co., Ltd., Anhui (CN); BOE Technology Group Co., Ltd., Beijing (CN)

(72) Inventors: Xinxiu Zhang, Beijing (CN); Min He, Beijing (CN); Xiaodong Xie, Beijing (CN); Tianyu Zhang, Beijing (CN); Xue Zhao, Beijing (CN); Tengfei Zhong, Beijing (CN); Huayu Sang, Beijing (CN); Bin Pang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/907,000

(22) PCT Filed: Oct. 20, 2021

(86) PCT No.: PCT/CN2021/124959
§ 371 (c)(1),
(2) Date: Sep. 22, 2022

(87) PCT Pub. No.: WO2022/111144
PCT Pub. Date: Jun. 2, 2022

(65) Prior Publication Data
US 2023/0376159 A1  Nov. 23, 2023

(30) Foreign Application Priority Data
Nov. 30, 2020 (CN) .......................... 202011382853.8

(51) Int. Cl.
*G06F 3/047* (2006.01)

(52) U.S. Cl.
CPC .... *G06F 3/047* (2013.01); *G06F 2203/04103* (2013.01); *G06F 2203/04107* (2013.01)

(58) Field of Classification Search
CPC ........... G06F 3/047; G06F 2203/04107; G06F 2203/04103
See application file for complete search history.

(56) References Cited

U.S. PATENT DOCUMENTS

| 2013/0201348 A1* | 8/2013 | Li | G06F 3/0443 |
| | | | 348/174 |
| 2014/0184950 A1* | 7/2014 | Chu | G06F 3/0446 |
| | | | 349/12 |

(Continued)

FOREIGN PATENT DOCUMENTS

| CN | 104216584 A | 12/2014 |
| CN | 104793803 A | 7/2015 |

(Continued)

*Primary Examiner* — Muhammad N Edun
(74) *Attorney, Agent, or Firm* — Nath, Goldberg & Meyer; Joshua B. Goldberg

(57) ABSTRACT

Provided are a touch substrate and a method for manufacturing the same, and a display apparatus. The touch substrate includes: a base, a first touch layer and a second touch layer on the base, and an interlayer insulation layer between the second touch layer and the first touch layer. The first touch layer includes first touch electrodes and touch signal lines arranged side by side along a first direction and extending in a second direction. The second touch layer includes second touch electrodes arranged side by side along the second direction, each of which extends in the first direction and is connected to at least one touch signal lines through a first connection via penetrating through the interlayer insulation layer. The first touch layer further includes at least one shielding electrode extending in the second direction and (Continued)

arranged between the first touch electrodes and the touch signal lines.

18 Claims, 8 Drawing Sheets

(56) References Cited

U.S. PATENT DOCUMENTS

2020/0081576 A1\* 3/2020 Takada .................. G06F 3/0446
2020/0300900 A1   9/2020 Bolender

FOREIGN PATENT DOCUMENTS

| CN | 106610745 A | 5/2017 |
| CN | 107092393 A | 8/2017 |
| CN | 109213369 A | 1/2019 |
| CN | 111045553 A | 4/2020 |
| CN | 111124167 A | 5/2020 |
| CN | 112506373 A | 3/2021 |

\* cited by examiner

TOUCH SUBSTRATE, METHOD FOR MANUFACTURING TOUCH SUBSTRATE AND DISPLAY APPARATUS

This is a National Phase Application filed under 35 U.S.C. 371 as a national stage of PCT/CN2021/124959, filed Oct. 20, 2021, an application claiming the benefit of Chinese Application No. 202011382853.8, filed Nov. 30, 2020, the content of each of which is hereby incorporated by reference in its entirety.

TECHNICAL FIELD

The present disclosure relates to the field of display technology, and specifically relates to a touch substrate, a method for manufacturing the touch substrate, and a display apparatus.

BACKGROUND

With the development of touch screen technology, various touch technologies have emerged. According to different working principles of the touch screens, the touch technology is generally classified into: resistive touch screens, capacitive touch screens, infrared touch screens, electromagnetic touch screens, and surface acoustic wave touch screens. Among them, the capacitive touch screens are most widely used. The capacitive touch screens include self-capacitance touch screens and mutual capacitance touch screens. Due to the advantages of strong anti-interference capability, high sensitivity, strong multi-point touch and identification capabilities and the like, the mutual capacitance touch screen has become one of the current mainstream touch screens.

SUMMARY

To solve at least one of the problems in the related art, the present disclosure provides a touch substrate and a method for manufacturing the same, and a display apparatus.

In a first aspect, an embodiment of the present disclosure provides a touch substrate, including: a base, a first touch layer and a second touch layer on the base, and an interlayer insulation layer between the second touch layer and the first touch layer; where
  the first touch layer includes a plurality of first touch electrodes and a plurality of touch signal lines arranged side by side along a first direction and extending in a second direction; and
  the second touch layer includes a plurality of second touch electrodes arranged side by side along the second direction, each of the second touch electrodes extends in the first direction and is connected to at least one of the touch signal lines through a first connection via penetrating through the interlayer insulation layer; and where
  the first touch layer further includes at least one shielding electrode extending in the second direction and arranged between at least part of the first touch electrodes and at least part of the touch signal lines.

One touch signal line is disposed between every two adjacent first touch electrodes.

The at least one shielding electrode is disposed between every two adjacent first touch electrodes.

Each touch signal line includes a first side and a second side opposite to each other in the first direction; and the shielding electrode is disposed between the first touch electrode and only one of the first side or the second side of the touch signal line.

The first touch layer further includes: a plurality of first redundant touch electrodes arranged side by side along the first direction, each of which extends in the second direction; and the plurality of first redundant touch electrodes are located between at least adjacent two of the first touch electrodes, the touch signal lines, or the shielding electrode in the first touch layer.

The second touch layer further includes: a plurality of second redundant touch electrodes arranged side by side along the second direction, each of the second redundant touch electrodes extends in the first direction, and is disposed between, and configured to disconnect, two adjacent second touch electrodes.

The touch substrate includes a fan-out area; the base is further provided with first fan-out wires, second fan-out wires and a third fan-out wire in the fan-out area; the first fan-out wires are connected to the first touch electrodes, respectively; the second fan-out wires are connected to the touch signal lines, respectively; and the third fan-out wire is connected to the shielding electrode.

At least some of the first fan-out wire, the second fan-out wire, and the third fan-out wire are disposed in different layers, and/or at least one of the first fan-out wire, the second fan-out wire, or the third fan-out wire includes portions in different layers.

A first one of the first fan-out wire, the second fan-out wire, or the third fan-out wire is located in the second touch layer, a second one of the first fan-out wire, the second fan-out wire, or the third fan-out wire is located in the first touch layer, and a third one of the first fan-out wire, the second fan-out wire, or the third fan-out wire includes a first signal sub-line and a second signal sub-line electrically connected; one of the first signal sub-line or the second signal sub-line is located in the second touch layer, and the other of the first signal sub-line or the second signal sub-line is located in the first touch layer.

The first fan-out wire is located in the first touch layer;
  the second fan-out wire is located in the second touch layer, and connected to the touch signal line through a second connection via penetrating through the interlayer insulation layer;
  the third fan-out wire includes the first signal sub-line and the second signal sub-line electrically connected; the first signal sub-line is located in the second touch layer, and the second signal sub-line is located in the first touch layer; and the first signal sub-line has one end connected to the shielding electrode through a third connection via penetrating through the interlayer insulation layer, and another end connected to the second signal sub-line through a fourth connection via penetrating through the interlayer insulation layer.

The second connection via, the third connection via, and the fourth connection via are each located in the fan-out area.

The shielding electrode includes a ground electrode.

A connection line of at least some first connection vias intersects with the first direction.

At least one of the first touch layer or the second touch layer has a metal mesh structure.

In a second aspect, an embodiment of the present disclosure provides a method for preparing a touch substrate, including:
  forming a pattern including a first touch layer on a base through a patterning process; where the first touch layer includes a plurality of first touch electrodes, a plurality of touch signal lines and at least one shielding electrode arranged side by side along a first direction; the plurality of first touch control electrodes and the plurality of touch signal lines both extend in a second direction; and the shielding electrode extends in the second direction;

forming an interlayer insulation layer and forming a first connection via in the interlayer insulation layer;

forming a pattern of a second touch layer through a patterning process; where the second touch layer includes a plurality of second touch electrodes arranged side by side along the second direction, each of the second touch electrodes extends in the first direction, and the touch signal lines are connected to the second touch electrodes through the first connection vias penetrating through the interlayer insulation layer one to one; where the shielding electrode is disposed between at least one of the first touch electrodes and at least one of the touch signal lines.

In a third aspect, an embodiment of the present disclosure provides a display apparatus, including the touch substrate as described above.

DETAIL DESCRIPTION OF EMBODIMENTS

In order to enable those skilled in the art to better understand the technical solutions of the present disclosure, the present disclosure will be further described in detail in combination with the drawings and specific embodiments.

Unless otherwise defined, technical or scientific terms used in the present disclosure are intended to have general meanings as understood by those of ordinary skill in the art. The words "first", "second" and similar terms used in the present disclosure do not denote any order, quantity, or importance, but are used merely for distinguishing different components from each other. Also, the use of the terms "a", "an", "the" or a similar referent does not denote a limitation of quantity, but rather denotes the presence of at least one element. The word "comprising/comprise", "including/include" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", or the like are merely used to indicate a relative positional relationship, and when an absolute position of the described object is changed, the relative positional relationship may also be changed accordingly.

Depending on the attachment mode of the touch screen with the display panel, touch screens generally include: out-cell touch screens (e.g., touch screens attached to the display panel), on-cell touch screens (i.e., touch screens disposed between a color filter substrate and a polarizer of the display panel), and in-cell touch screens (i.e., touch screens embedded in a liquid crystal pixel).

For a mutual capacitance touch screen, the basic working principle thereof is that: an inherent capacitance is present between two adjacent conductors, and when another conductor (like a finger) approaches the two conductors, an inductive capacitance is formed between the another conductor and the two conductors, and the inductive capacitance is connected in parallel to the inherent capacitance, increasing the whole capacitance. When the finger is removed, the capacitance is restored to the inherent capacitance. A driving control circuit is provided at a periphery of the touch screen, and determines, by driving to detect changes in the capacitance with and without the finger, whether and where the touch screen is touched, so that a touch function of the touch screen is completed.

Figure 1:
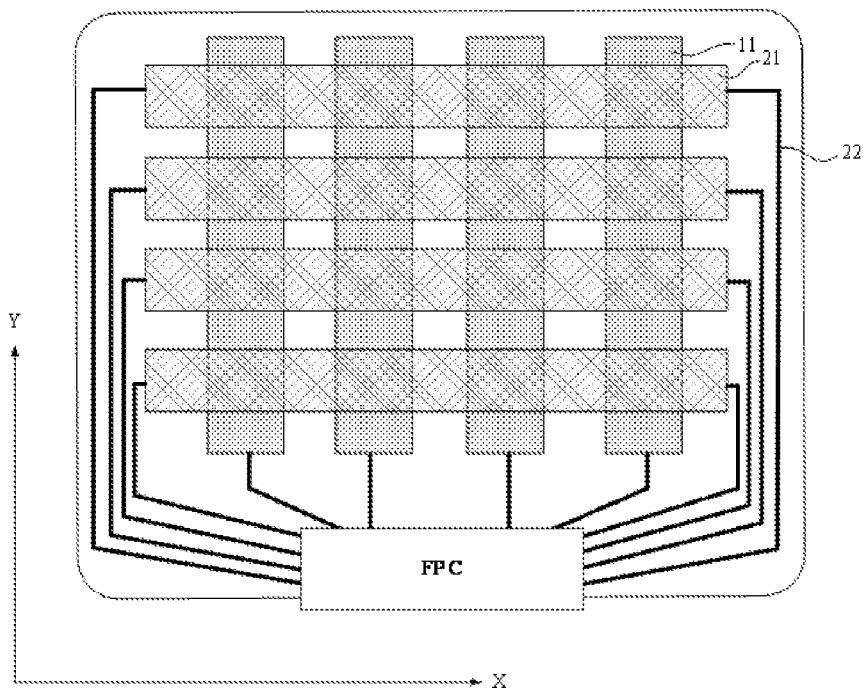
FIG. 1 is a schematic diagram of an exemplary touch screen.

FIG. 1 is a schematic diagram of an exemplary touch screen. As shown in FIG. 1, the touch screen has a touch area and a peripheral area surrounding the touch area. The touch screen includes, in the touch area, a plurality of first touch electrodes arranged side by side along a first direction, and a plurality of second touch electrodes arranged side by side along a second direction. Each first touch electrode extends in the second direction, and each second touch electrode extends in the first direction. The second touch electrodes and the first touch electrodes are insulated from each other. In other words, a first interlayer insulation layer 200 may be provided between the second touch electrodes and the first touch electrodes. The first direction and the second direction intersect with each other. For example: one of the first direction or the second direction is a row direction X, and the other of the first direction or the second direction is a column direction Y. One of the second touch electrode or the first touch electrode is a driving electrode 21, and the other of the second touch electrode or the first touch electrode is a sensing electrode 11. In an embodiment of the present disclosure, the case where the first direction is the row direction X, the second direction is the column direction Y, the second touch electrode is the driving electrode 21, and the first touch electrode is the sensing electrode 11 is taken as an example for description. Obviously, the first direction and the second direction may be exchanged, and the second touch electrode and the first touch electrode may also be exchanged, and the above case where the first direction is the row direction X, the second direction is the column direction Y, the second touch electrode is the driving electrode 21, and the first touch electrode is the sensing electrode 11 does not form any limitation to the protection scope of the embodiments of the present disclosure.

With continued reference to FIG. 1, the driving electrodes 21 and the sensing electrodes 11 intersect with each other at spatial positions to form mutual capacitances (coupling capacitances), and a touch driving circuit FPC applies driving scanning signals to the driving electrodes 21 through touch signal lines 22. When a finger touches the touch screen, the mutual capacitance is changed and output through the sensing electrode 11. At this time, a controller detects, according to an electrical signal output from the sensing electrode 11, changes in the mutual capacitance to determine a specific touch position.

The inventor has found that, in general, the scanning signal is input into the driving electrode 21 at an end of the driving electrode 21 through the touch signal line 22, and therefore the touch signal line 22 is located in the peripheral area of the touch screen, and since a position where the touch signal line 22 is located is opaque, while a position without the touch signal line 22 is transparent, which causes non-uniform transmittance, the position where the touch signal line 22 is located is desired to be shielded with a light shielding layer, which may lead to existence of a bezel in the peripheral area of the touch screen.

Figure 2:
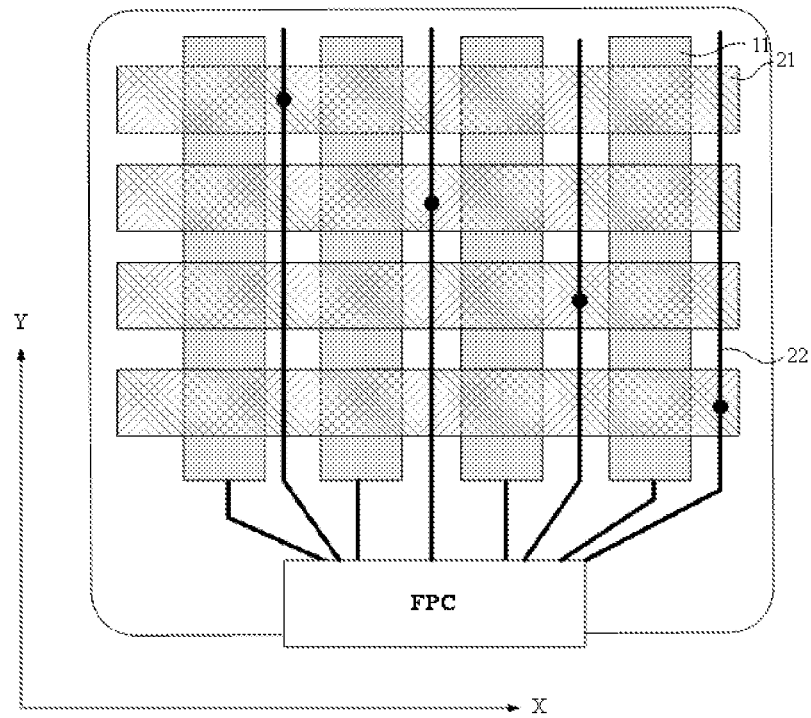
FIG. 2 is a schematic diagram of another exemplary touch screen.

FIG. 2 is a schematic diagram of another exemplary touch screen. As shown in FIG. 2, in order to narrow and even eliminate the bezel of the touch screen, the touch signal lines 22 may be disposed in the touch area. In such case, a layer where the touch signal lines 22 are located may be added in the touch screen. For example, the touch signal lines 22 are disposed on a side of the driving electrodes 21 away from the sensing electrodes 11, a second interlayer insulation layer 200 is disposed between the touch signal lines 22 and the driving electrodes 21, and each touch signal line 22 and the driving electrode 21 corresponding thereto may be electrically connected through a connection via penetrating through the second interlayer insulation layer 200. It can be seen from FIG. 2, however, the touch signal lines 22 need to extend to a fan-out area in the peripheral area, and connected to the touch driving circuit FPC through a bonding process. In this case, the touch signal lines 22 have the same extending direction as the sensing electrodes 11, and signals of the touch signal lines 22 and the sensing electrodes 11 are prone to interference with each other, thereby affecting accuracy of the touch detection.

In view of the above problems, embodiments of the present disclosure provide the following solutions.

Figure 3:
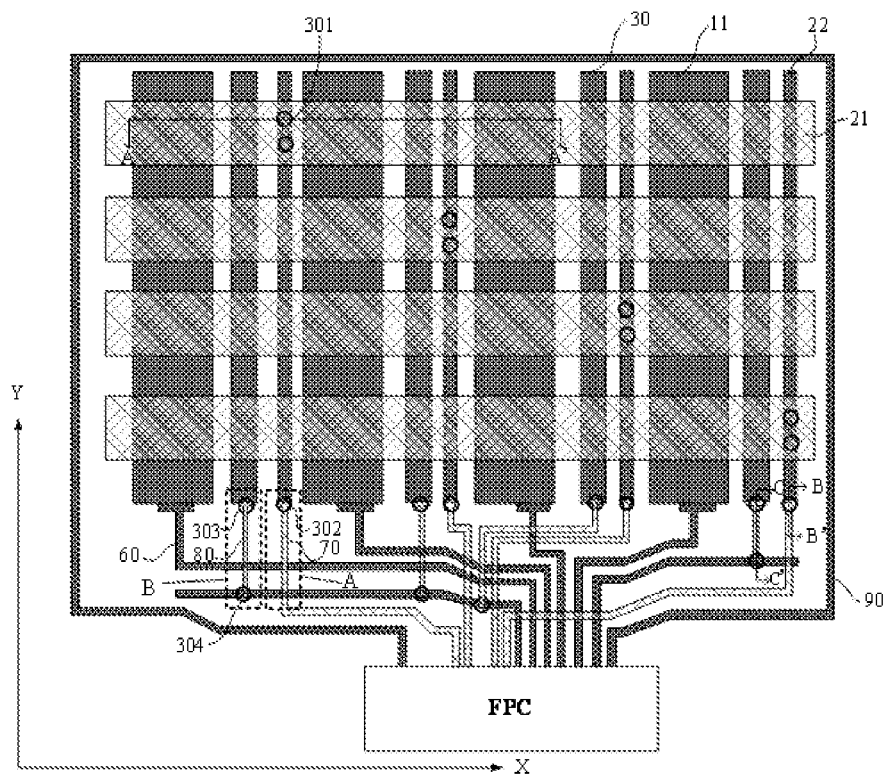
FIG. 3 is a schematic diagram of a touch substrate according to an embodiment of the present disclosure.
Figure 4:
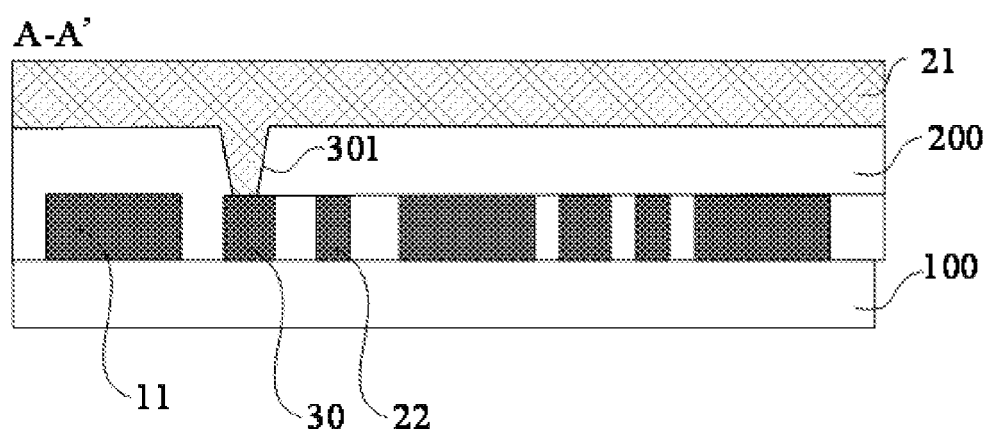
FIG. 4 is a cross-sectional view of a touch substrate along direction A-A' according to an embodiment of the present disclosure.
Figure 5:
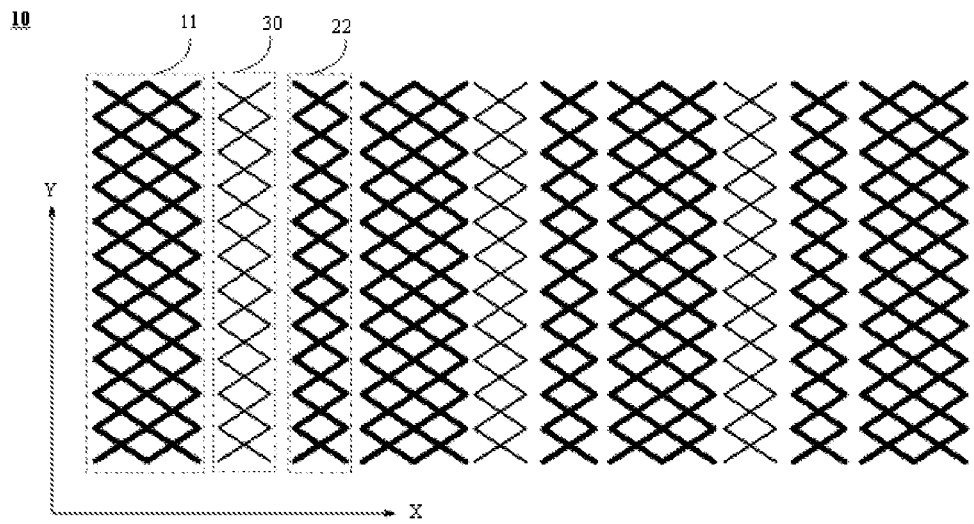
FIG. 5 is a schematic diagram of a first touch layer according to an embodiment of the present disclosure.
Figure 6:
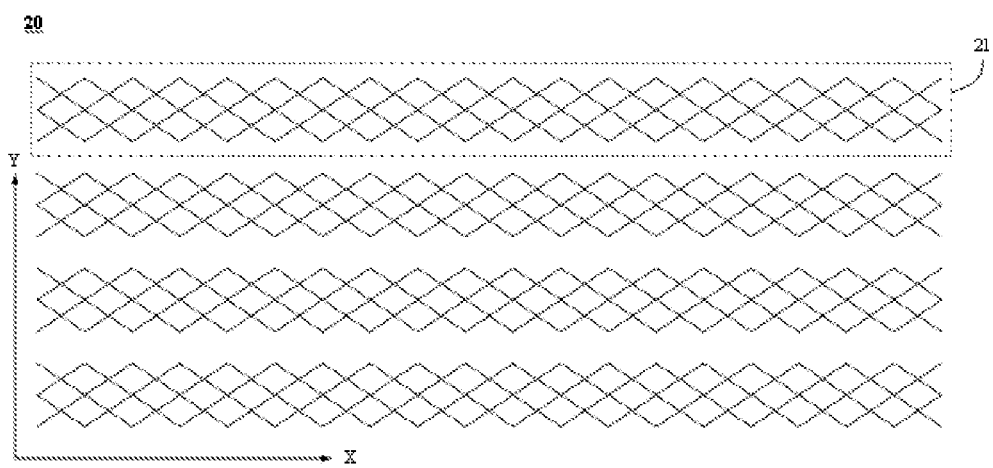
FIG. 6 is a schematic diagram of a second touch layer according to an embodiment of the present disclosure.

In a first aspect, FIG. 3 is a schematic diagram of a touch substrate according to an embodiment of the present disclosure; FIG. 4 is a cross-sectional view of a touch substrate along direction A-A' according to an embodiment of the present disclosure; FIG. 5 is a schematic diagram of a first touch layer according to an embodiment of the present disclosure; and FIG. 6 is a schematic diagram of a second touch layer according to an embodiment of the present disclosure. As shown in FIGS. 3 to 6, an embodiment of the present disclosure provides a touch substrate, including a base 100, and a first touch layer 10, an interlayer insulation layer 200, and a second touch layer 20 sequentially disposed on the base 100. The first touch layer 10 includes a plurality of sensing electrodes 11 and a plurality of touch signal lines 22 arranged side by side along a row direction X. The plurality of sensing electrodes 11 and the plurality of touch signal lines 22 extend in a column direction Y. The second touch layer 20 includes a plurality of driving electrodes 21 arranged side by side along the column direction Y, each of which extends in the row direction X. First connection vias 301 are provided in the interlayer insulation layer 200, and each driving electrode 21 is connected to at least one of the touch signal lines 22 through the first connection via 301 penetrating through the interlayer insulation layer 200 to implement connection between the driving electrode 21 and the touch signal line 22 corresponding to the driving electrode 21, so that the touch signal line 22 provides a touch driving signal for the driving electrode 21. In particular, in the embodiment of the present disclosure, the first touch layer 10 of the touch substrate further includes at least one shielding electrode 30 extending in the column direction Y and disposed between at least some of the sensing electrodes 11 and the touch signal lines 22 to avoid interference between signals of adjacent sensing electrodes 11 and touch signal lines 22.

It should be noted that the shielding electrode 30 has a shielding function as the name implies, and therefore, it will be appreciated that the shielding electrode 30 is desired to be connected to a fixed potential to implement the shielding function. The fixed potential includes, but is not limited to, a ground signal. In other words, the shielding electrode 30 may be a ground shielding electrode 30. It should be further noted that, referring to FIG. 4, in the embodiment of the present disclosure, the first touch layer 10 is located on a side of the second touch layer 20 close to the base 100, but in actual products, positions of the first touch layer 10 and the second touch layer 20 may be exchanged.

In the touch substrate provided in the embodiment of the present disclosure, the first touch layer 10 includes not only the sensing electrodes 11, but also the touch signal lines 22 and the shielding electrodes 30. The touch signal lines 22 are connected to the driving electrodes 21 through first connection vias 301 penetrating through the interlayer insulation layer 200, and each shielding electrode 30 is disposed between the touch signal line 22 and the sensing electrode 11 corresponding to the shielding electrode, so that interference between signals of the touch signal line 22 and the sensing electrode 11 can be reduced with the shielding electrode 30. Meanwhile, since the first touch layer 10 includes the touch signal lines 22 and the shielding electrodes 30, that is, the touch signal lines 22, the shielding electrodes 30 and the sensing electrodes 11 are disposed in a same layer and made of a same material, the touch signal lines 22, the shielding electrodes 30 and the sensing electrodes 11 may be formed in one patterning process, which will not increase the process cost and thickness of the touch substrate.

In some implementations, one touch signal line 22 is disposed between every two adjacent sensing electrodes 11 of the first touch layer 10. For example, the sensing electrodes 11 and the touch signal lines 22 are alternately arranged. Such arrangement is provided because the touch signal lines 22 are to be electrically connected to the driving electrodes 21 through first connection vias 301 penetrating through the interlayer insulation layer 200, and by alternatively arranging the touch signal lines 22 and the sensing electrodes 11, the touch signal lines 22 can be prevented from being arranged densely, in such case, the problem that a yield of the touch substrate is reduced due to the first connection vias 301 being arranged densely can be avoided.

Obviously, if a relatively large distance is provided between two adjacent sensing electrodes 11, more than one touch signal lines 22 may be disposed between the two adjacent sensing electrodes 11. That is, the number of touch signal lines 22 between adjacent sensing electrodes 11 may be set depending on a distance between the adjacent sensing electrodes 11. In the following description, for convenience of understanding, the case where one touch signal line 22 is disposed between every two adjacent sensing electrodes 11 is taken as an example for illustration, but it will be appreciated that this does not form any limitation to the protection scope of the embodiments of the present disclosure.

In some implementations, when the touch signal line 22 is disposed between every adjacent sensing electrodes 11, the shielding electrode 30 is provided between every adjacent sensing electrodes 11 to avoid the interference between signals of the touch signal line 22 and the sensing electrodes 11.

For example, one touch signal line 22 is disposed between any two adjacent sensing electrodes 11, the touch signal lines 22 are connected to the touch electrodes 21 one to one through the first connection vias 301 penetrating through the interlayer insulation layer 200, and different touch signal lines 22 are connected to different touch electrodes 21. Each touch signal line 22 includes a first side and a second side opposite to each other in the row direction X. If the first side is a side close to sensing electrode 11 on the left, then the second side is a side close to the sensing electrode on the right. In this case, the shielding electrode 30 may be disposed between the first side and/or the second side of the touch signal line 22 and the sensing electrodes 11.

For example, one touch signal line 22 is disposed between any two adjacent sensing electrodes 11, and when the number of sensing electrodes 11 is greater than the number of driving electrodes 21, the number of touch signal lines 22 on the touch substrate is also greater than the number of driving electrodes 21. In this case, a driving electrode 21 farther from the touch driving circuit FPC side may be connected to a plurality of touch signal lines 22. In this way, the problem of RC delay is reduced. When the driving electrode 21 is connected to a plurality of touch signal lines 22, at least one of the plurality of touch signal lines 22 is bound to the driving circuit FPC to provide a touch driving signal for the driving electrode 21, and the rest touch signal lines 22 may be in a floating state; or the plurality of touch signal lines 22 are connected in parallel to reduce the resistance. Each touch signal line 22 includes a first side and a second side opposite to each other in the row direction X. If the first side is a side close to the sensing electrode 11 on the left, then the second side is a side close to the sensing electrode on the right. In this case, the shielding electrode 30 may be disposed between the first side and/or the second side of the touch signal line 22 and the sensing electrodes 11.

In the following description, the case where one touch signal line 22 is disposed between any two adjacent sensing electrodes 11, the touch signal lines 22 are connected to the touch electrodes 21 one to one through the first connection vias 301 penetrating through the interlayer insulation layer 200, and different touch signal lines 22 are connected to different touch electrodes 21 is taken as an example for illustration. The positional relationship between the shielding electrodes 30 and the touch signal lines 22 will be described below with reference to the following specific examples.

In an example, referring to FIG. 6, in the first touch layer 10, one shielding electrode 30 and one touch signal line 22 are disposed between every two adjacent sensing electrodes 11. The touch signal line 22 includes a first side and a second side opposite to each other in the row direction X. The first side is a side close to the sensing electrode 11 on the left, and the second side is a side close to the sensing electrode on the right. For example, the shielding electrode 30 is located between the first side of the touch signal line 22 and the sensing electrode 11. Obviously, it is also feasible to dispose the shielding electrode 30 between the second side of the touch signal line 22 and the sensing electrode 11. In this way, interference between signals of the touch signal line 22 and the sensing electrode 11 adjacent to the touch signal line 22 is reduced as much as possible.

Figure 7:
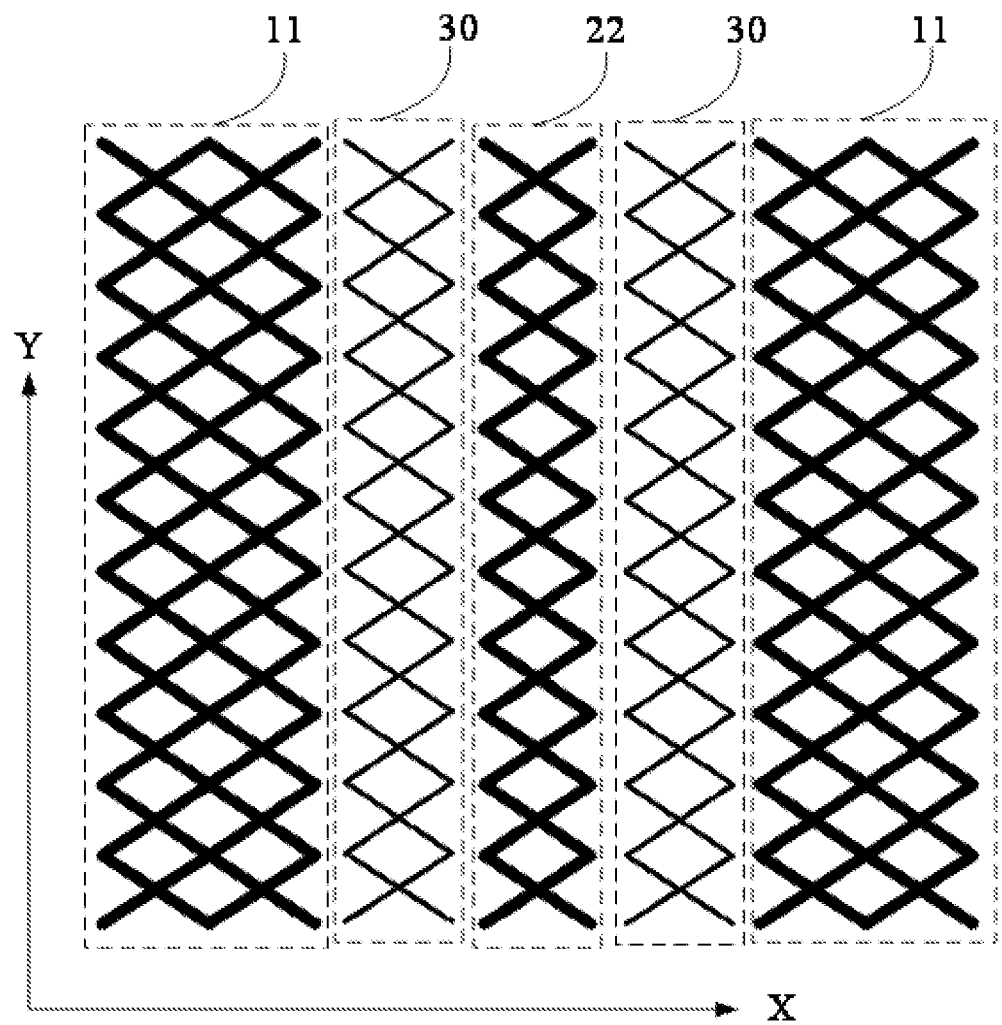
FIG. 7 is a schematic diagram of another first touch layer according to an embodiment of the present disclosure.

In another example, FIG. 7 is a schematic diagram of another first touch layer according to an embodiment of the present disclosure. As shown in FIG. 7, the structure of the first touch layer 10 is different from that of the first touch layer shown in FIG. 6 in that a shielding electrode 30 is disposed between the first side of the touch signal line 22 and the sensing electrode 11, and a shielding electrode 30 is disposed between the second side of the touch signal line 22 and the sensing electrode 11. In this way, the interference between signals of the touch signal line 22 and the sensing electrodes 11 adjacent to the touch signal line 22 reduced as much as possible.

Figure 8:
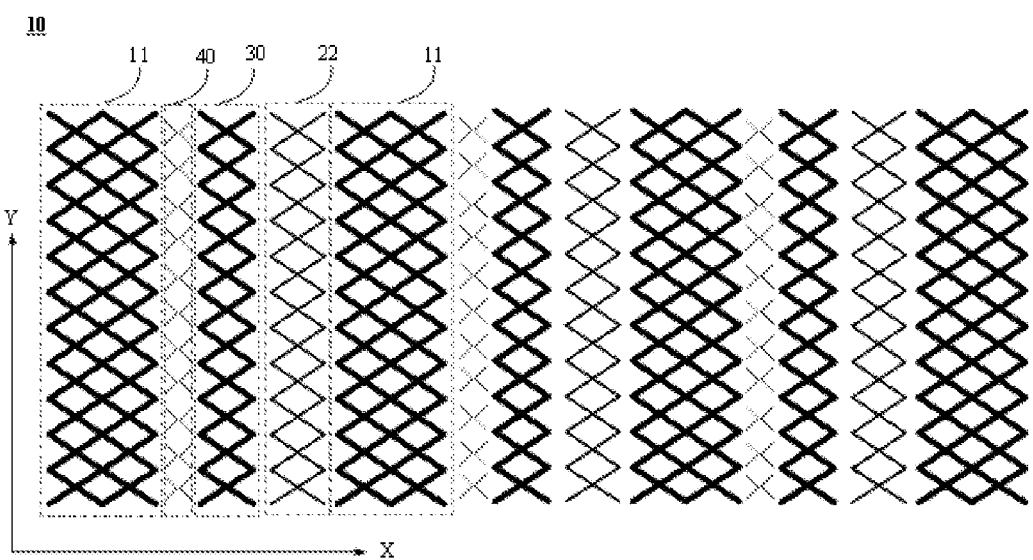
FIG. 8 is a schematic diagram of another first touch layer according to an embodiment of the present disclosure.

In some implementations, FIG. 8 is a schematic diagram of another first touch layer according to an embodiment of the present disclosure. As shown in FIG. 8, the first touch layer 10 includes not only the sensing electrodes 11, the touch signal lines 22, and the shielding electrodes 30, but also a plurality of first redundant touch electrodes 40 arranged side by side along the row direction X. Each first redundant touch electrode 40 extends in the column direction Y. The sensing electrodes 11 and the shielding electrodes 30 in the first touch layer 10 are disconnected from each other by the first redundant touch electrodes 40. For example, the shielding electrode 30 is disposed between the touch signal line 22 and the sensing electrode 11 adjacent to the touch signal line 22. In this case, by providing the first redundant touch electrode 40 between the sensing electrode 11 and the shielding electrode 30, the risks of short circuit and electrostatic discharge (ESD) among the sensing electrode 11, the touch signal line 22 and the shielding electrode 30 can be effectively avoided. In addition, in some implementations of the present disclosure, the sensing electrode 11, the touch signal line 22, the shielding electrode 30, and the first redundant touch electrode 40 are all structures of the first touch layer 10, and may be formed through one patterning process. For example, the sensing electrode 11, the touch signal line 22, the shielding electrode 30 and the first redundant touch electrode 40 are designed to have a same pattern, except that the pattern of the first redundant touch electrode 40 can be cut up. In this way, the first redundant touch electrode 40 is disconnected from the sensing electrode 11, the touch signal line 22 and the shielding electrode 30, while the sensing electrode 11, the touch signal line 22 and the shielding electrode 30 can also be disconnected from each other, which will not increase the process cost and is easy to implement.

Figure 9:
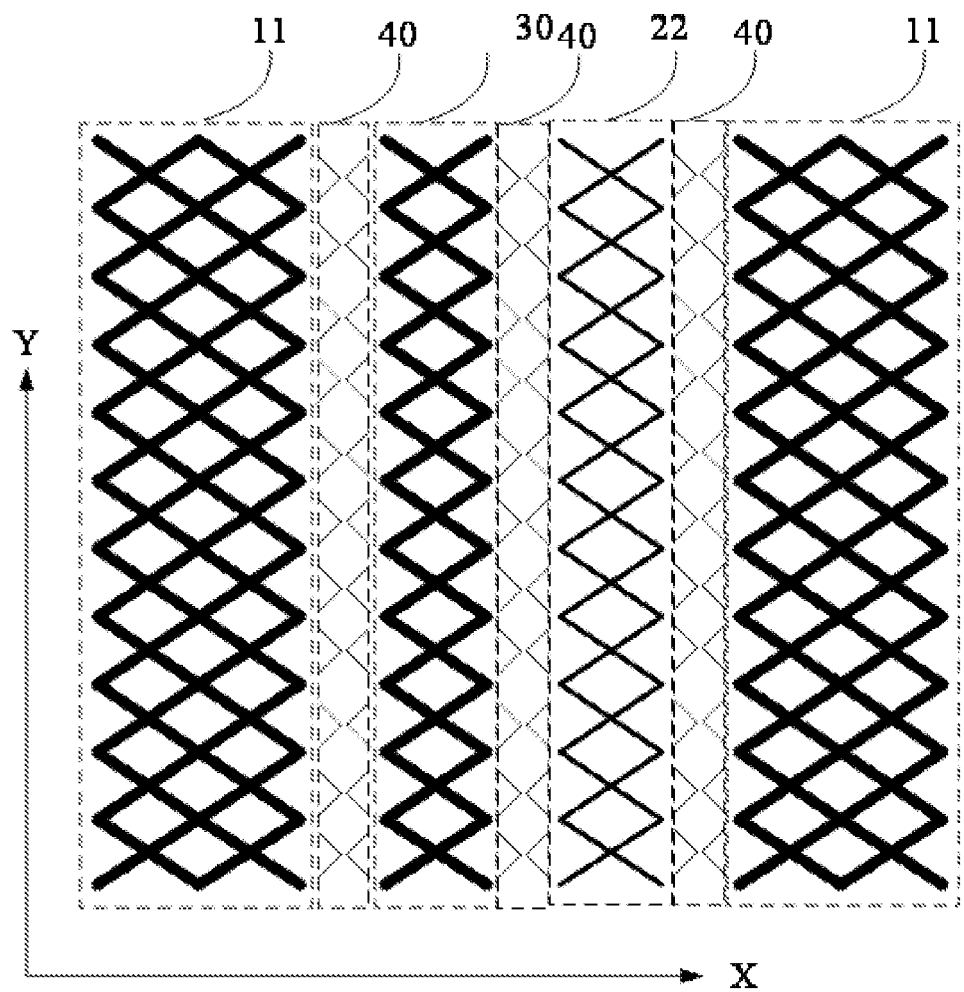
FIG. 9 is a schematic diagram of another first touch layer according to an embodiment of the present disclosure.

In some implementations, FIG. 9 is a schematic diagram of another first touch layer according to an embodiment of the present disclosure. As shown in FIG. 9, the first touch layer 10 has substantially the same structure as the first touch layer 10 shown in FIG. 8, except that the first redundant touch electrode 40 is disposed not only between the sensing electrode 11 and the shielding electrode 30, but also between the shielding electrode 30 and the touch signal line 22, as well as between the touch signal line 22 and the sensing electrode 11. In this way, the risks of short circuit and electrostatic discharge (ESD) among the sensing electrode 11, the touch signal line 22 and the shielding electrode 30 can be effectively avoided. The structures and formation methods of the sensing electrode 11, the touch signal line 22, the shielding electrode 30 and the first redundant touch electrode 40 may be the same as those of the first touch layer shown in FIG. 8, and thus are not repeated here.

Figure 10:
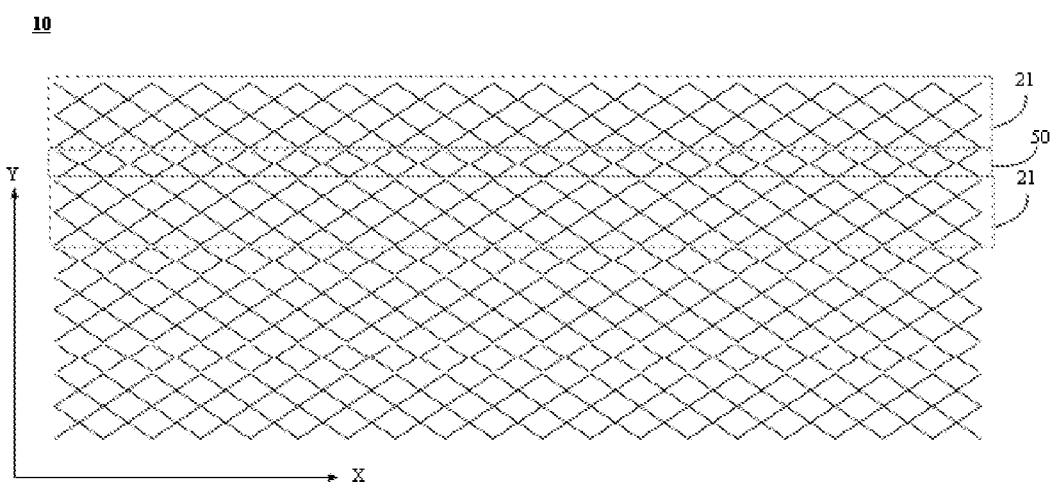
FIG. 10 is a schematic diagram of another second touch layer according to the embodiment of the present disclosure.

In some embodiments, FIG. 10 is a schematic diagram of another second touch layer according to the embodiment of the present disclosure. As shown in FIG. 10, the second touch layer 20 includes not only the driving electrodes 21, but also a plurality of second redundant touch electrodes 50 arranged side by side along the column direction Y. Each second redundant touch electrode 50 extends in the row direction X. One second redundant touch electrode 50 is disposed between every two adjacent driving electrodes 21, and configured to disconnected the two adjacent driving electrodes 21 from each other. For example, the driving electrodes 21 and the second redundant touch electrodes 50 are alternately arranged, and disconnected from each other. In an embodiment of the present disclosure, by disconnecting two adjacent driving electrodes 21 from each other with the second redundant touch electrode 50, the risks of short circuit and electrostatic discharge (ESD) between the adjacent driving electrodes 21 can be effectively avoided. In addition, in an embodiment of the present disclosure, the driving electrodes 21 and the second redundant touch electrodes 50 are all structures of the second touch layer 20, and may be formed through one patterning process. For example, the driving electrodes 21 and the second redundant touch electrodes 50 are designed to have a same pattern, except that the patterns of the second redundant touch electrodes 50 can be cut up. In such way, the second redundant touch electrodes 50 are disconnected from the driving electrodes 21, while the driving electrodes 21 can also be disconnected from each other, which will not increase the process cost and is easy to implement.

In some implementations, the first touch layer 10 and the second touch layer 20 may each be formed of an indium tin oxide (ITO) film, which is a transparent conductor that is convenient for normal touch of the touch substrate and does not affect normal display of the display apparatus. However, since the second touch layer 20 and the first touch layer 10 almost cover the entire touch area of the touch substrate, the ITO film, with a particularly large surface resistance, is not suitable for touch control of a large-sized screen. In addition, as the transparent electrode of most display apparatuses, the ITO film resources are relatively short, and price thereof is gradually increased, which is not favorable for reducing the manufacturing cost of the touch substrate and thus the display apparatus.

In some implementations of the present disclosure, at least one of the first touch layer 10 and the second touch layer 20 employs a mesh structure. For example, the first touch layer 10 and the second touch layer 20 are both metal mesh touch layers. In the embodiment of the present disclosure, the first touch layer 10 and/or the second touch layer 20 adopt a metal mesh touch layer, which means that the first touch layer 10 and/or the second touch layer 20 are made of a low resistance metal material (such as silver, aluminum, copper, molybdenum, niobium, or any alloy thereof), which is made to be a mesh since it is opaque. By forming the first touch layer 10 and/or the second touch layer 20 with a metal conductor, and into a mesh structure (i.e., providing a light-transmitting area therein), not only the touch substrate can be normally touched, the surface resistance of the first touch layer 10 and/or the second touch layer 20 in the touch substrate is also greatly reduced, thereby further reducing the power consumption of the touch substrate. In addition, since the metal conductor is more easily available and has lower cost than the ITO transparent conductor, the metal mesh first touch layer 10 and/or second touch layer 20 also reduce the production cost of the touch substrate.

In some implementations, the interlayer insulation layer 200 between the first touch layer 10 and the second touch layer 20 may be made of an organic material. In order for stable electrical connection between the driving electrode 21 and the touch signal line 22, each touch signal line 22 may be electrically connected to the driving electrode 21 corresponding thereto through a plurality of first connection vias 301 penetrating through the interlayer insulation layer 200. For more details, reference may be made to FIG. 3. For example, each touch signal line 22 may be electrically connected to the driving electrode 21 corresponding thereto through two first connection vias 301 which may be arranged side by side along the column direction Y. Obviously, the first connection vias 301 may also be arranged side by side along the row direction X. In an example, a connection line of a part of the first connection vias 301 connecting different driving electrodes 21 with the touch signal lines 22 intersects with the row direction X. In this way, the first connection vias 301 may be arranged dispersedly so that the first connection vias 301 are prevented from arranging in the row direction X to affect toughness of the touch substrate, reduce the bending resistance of the touch substrate, and thus affect a yield of the touch substrate.

Figure 11:
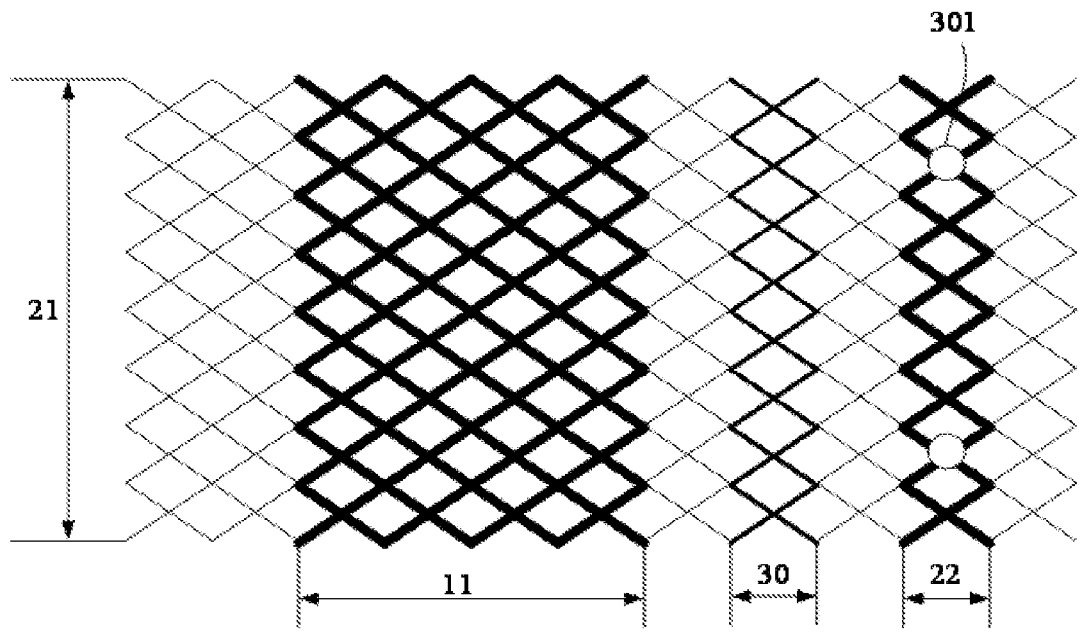
FIG. 11 is a schematic diagram illustrating a connection between a touch signal line and a driving electrode according to an embodiment of the present disclosure.

In an example, FIG. 11 is a schematic diagram illustrating a connection between a touch signal line and a driving electrode according to an embodiment of the present disclosure. As shown in FIG. 11, a touch signal line 22 is connected to a driving electrode 21 through a plurality of first connection vias 301 penetrating through the interlayer insulation layer 200. The case where one touch signal line 22 is connected to one driving electrode 21 through two first connection vias 301 is taken as an example in FIG. 11. In this case, the two first connection vias 301 are arranged side by side along the column direction Y, because the first connection vias 301 in a same column can facilitate alignment with a mask during manufacturing, as well as manufacturing of the first connection vias 301. Obviously, the plurality of first connection vias 301 connecting the touch signal line 22 with the driving electrode 21 may also be arranged along the row direction X, which will not be described in detail here.

Figure 12:
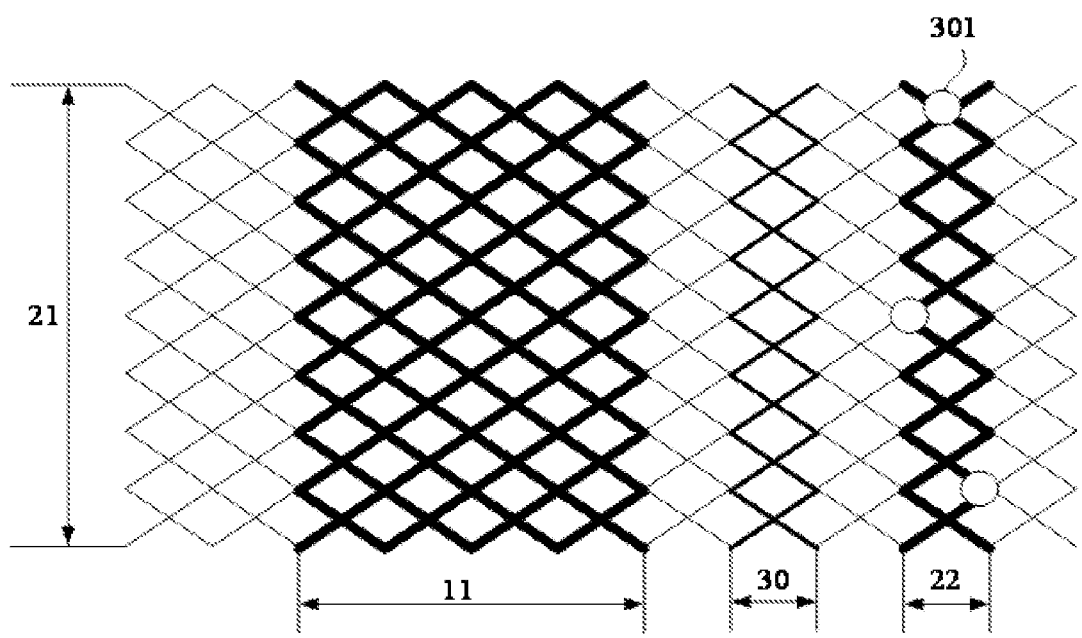
FIG. 12 is another schematic diagram illustrating a connection between a touch signal line and a driving electrode according to an embodiment of the present disclosure.

In another example, FIG. 12 is another schematic diagram illustrating a connection between a touch signal line and a driving electrode according to an embodiment of the present disclosure. As shown in FIG. 12, a touch signal line 22 may be connected to a driving electrode 21 through at least three first connection vias 301 which are not arranged in line along the row direction X and are not arranged in line along the column direction Y. Therefore, an irregular arrangement may be formed, and moiré or other display problems can be prevented.

It should be noted that, in the embodiments of the present disclosure, the symbol "○" at the position of the first connection via 301 does not represent an actual shape of the first connection via 301, and the shape of the first connection via 301 depends on the shape of the first connection via 301 used in the patterning process. A top view of the first connection via 301 may have a rounded quadrangle structure or the like.

In addition, in an embodiment of the present disclosure, in order for a stable connection between the touch signal line 22 and the driving electrode 21, the touch signal line 22 has a larger line width at the position of the first connection via 301 than at other positions. For example, the touch signal line 22 protrudes about 6 μm on both sides of the position of the first connection via 301.

In some implementations, the touch substrate has a touch area, and a peripheral area surrounding the touch area. The first touch layer 10 and the second touch layer 20 as described above are located in the touch area. The peripheral area includes a fan-out area on a side of the touch area, and in an implementation of the present disclosure, the case where the fan-out area is close to an end of the sensing electrode 11 (i.e., a lower side of the touch substrate shown in FIG. 3) is taken as an example. Referring to FIG. 3, the touch substrate further includes first fan-out wires 60, second fan-out wires 70 and third fan-out wires 80 in the fan-out area. One first fan-out wire 60 is connected to one sensing electrode 11. One second fan-out wire 70 is connected to one touch signal line 22. One third fan-out wire 80 is connected to one shielding electrode 30. For example, the first fan-out wires 60 are connected to the sensing electrodes 11 in one-to-one correspondence, and configured to output touch signals sensed by the sensing electrodes 11; the second fan-out wires 70 are connected to the touch signal lines 22 in one-to-one correspondence, and configured to provide driving scanning signals for the driving electrodes 21; and the third fan-out wires 80 are connected to the shielding electrodes 30 in one-to-one correspondence, and configured to provide ground signals for the shielding electrodes 30.

It should be noted that the first fan-out wires 60, the second fan-out wires 70, and the third fan-out wires 80 will all extend to connection pads corresponding thereto, and the touch driving circuit FPC is bound to the connection pads to provide corresponding signals for the first fan-out wires 60 and the third fan-out wires 80, and process signals output from the second fan-out wires 70 to allow the controller to identify the touch information. A ground signal line 90 may be further disposed in the peripheral area of the touch substrate, and in this case, the shielding electrodes may also be connected to the ground signal line 90. The ground signal line 90 may be disposed in the same layer as the sensing electrodes 11, or in the same layer as the driving electrodes 21, which is not limited in the embodiments of the present disclosure.

In an example, to avoid the risk of short circuit among the first fan-out wire 60, the second fan-out wire 70, and the third fan-out wire 80, in an implementation of the present disclosure, a first one of the first fan-out wire 60, the second fan-out wire 70, and the third fan-out wire 80 is located in the second touch layer 20, a second one of the first fan-out wire 60, the second fan-out wire 70, and the third fan-out wire 80 is located in the first touch layer 10, and a third one of the first fan-out wire 60, the second fan-out wire 70, and the third fan-out wire 80 includes a first signal sub-line 801 and a second signal sub-line 802 electrically connected. One of the first signal sub-line 801 or the second signal sub-line 802 is located in the second touch layer 20, and the other of the first signal sub-line 801 or the second signal sub-line 802 is located in the first touch layer 10.

Figure 13:
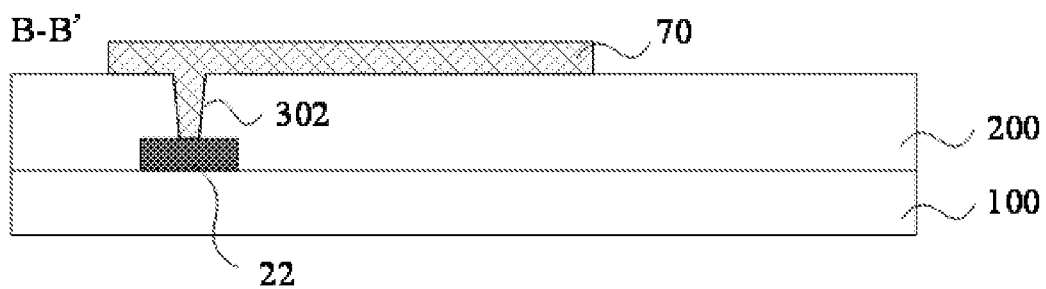
FIG. 13 is a cross-sectional view of a touch substrate along direction B-B' according to an embodiment of the present disclosure.
Figure 14:
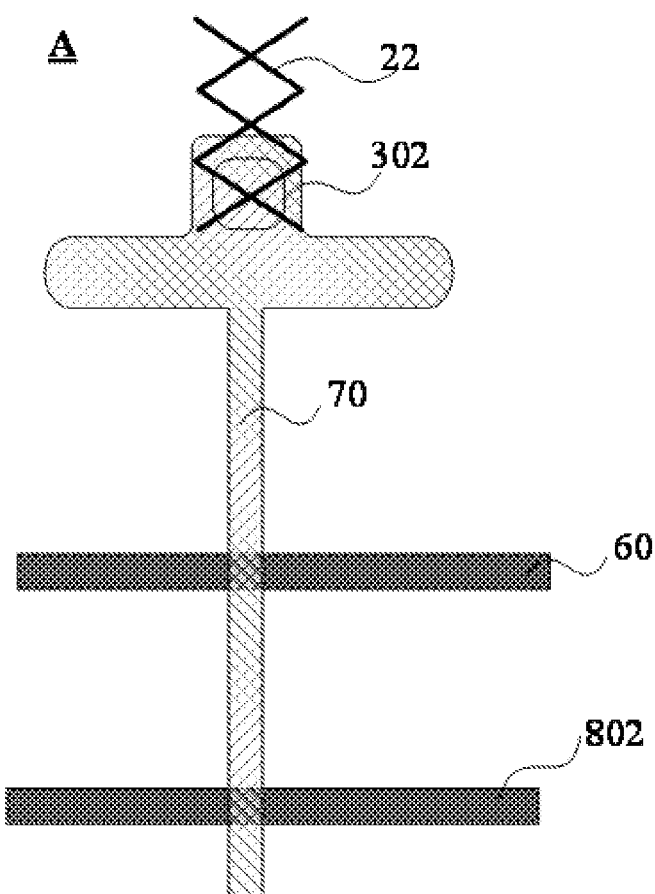
FIG. 14 is an enlarged top view taken at location A of FIG. 3.
Figure 15:
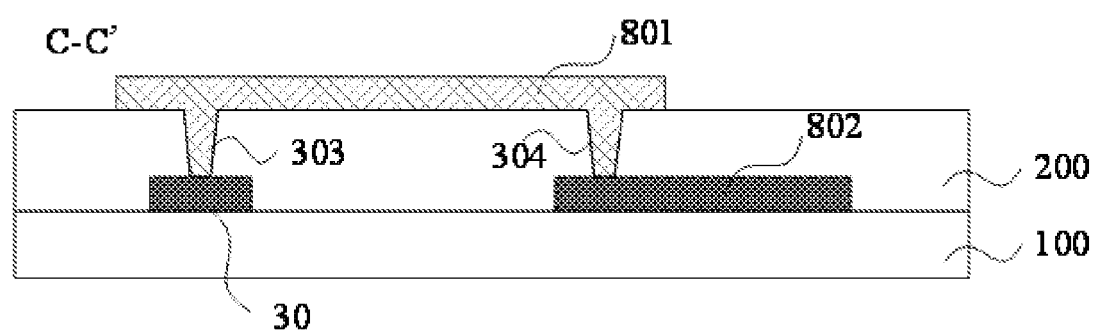
FIG. 15 is a cross-sectional view of a touch substrate along direction C-C' according to an embodiment of the present disclosure.
Figure 16:
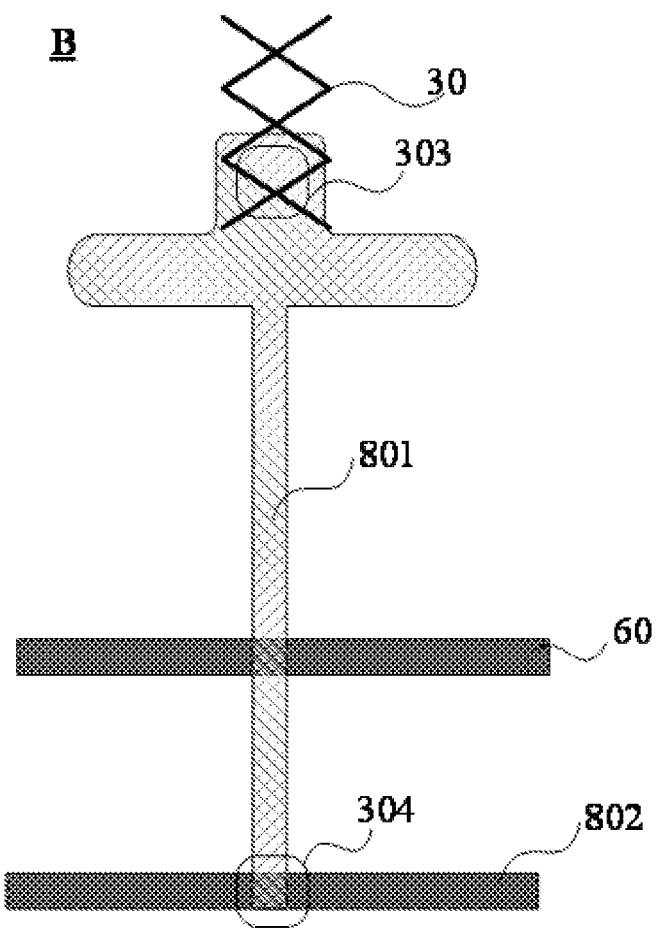
FIG. 16 is an enlarged top view taken at a position B of FIG. 3.

For example: FIG. 13 is a cross-sectional view of a touch substrate along direction B-B' according to an embodiment of the present disclosure. As shown in FIG. 13, the second fan-out wire 70 is connected to the touch signal line 22 through a second connection via 302 penetrating through the interlayer insulation layer 200. FIG. 14 is an enlarged top view taken at a position A of FIG. 3. As shown in FIG. 14, the second connection via 302 may have a rectangular shape. The second fan-out wire 70 is designed to have a greater line width at a position of the second connection via 302 than at other positions, so as to ensure that when the touch signal line 22 adopts a metal mesh structure, the second fan-out wire 70 can be well electrically connected with the touch signal line 22 to ensure stability of the circuitry. FIG. 15 is a cross-sectional view of a touch substrate along direction C-C' according to an embodiment of the present disclosure. As shown in FIG. 15, the third fan-out wire 80 includes a first signal sub-line 801 and a second signal sub-line 802 electrically connected. The first signal sub-line 801 is located in the second touch layer 20, and the second signal sub-line 802 is located in the first touch layer 10. In this case, the first signal sub-line 801 has one end connected to the shielding electrode 30 through a third connection via 303 penetrating through the interlayer insulation layer 200, and another end connected to the second signal sub-line 802 through a fourth connection via 304 penetrating through the interlayer insulation layer 200. FIG. 16 is an enlarged top view taken at position B of FIG. 3. As shown in FIG. 16, the first signal sub-line 801 of the third fan-out wire 80 is designed to have a greater line width at a position of the third connection via 303 than at other positions, so as to ensure that when the shielding electrode 30 adopts a metal mesh structure, the first signal sub-line 801 of the third fan-out wire 80 can be well electrically connected the shielding electrode 30 to ensure stability of the circuitry. It can thus be seen that during formation of the first touch layer 10 and the second touch layer 20, the first fan-out wire 60, the second fan-out wire 70 and the third fan-out wire 80 can be formed, which will not increase the number of process steps.

It should be noted that, the above merely shows the example where among the first fan-out wire 60, the second fan-out wire 70 and the third fan-out wire 80, the third fan-out wire 80 includes the first signal sub-line 801 and the second signal sub-line 802, the first fan-out wire 60 is located in the first touch layer 10, and the second fan-out wire 70 is located in the second touch layer 20. In practical applications, however, layers where the first fan-out wire 60, the second fan-out wire 70, and the third fan-out wire 80 are located may be exchanged, as long as no short circuit will occur among the first fan-out wire 60, the second fan-out wire 70, and the third fan-out wire 80. In addition, since at least some of the first fan-out wire 60, the second fan-out wire 70, and the third fan-out wire 80 are disposed in different layers, or at least some parts of some fan-out wires are located in different layers, orthogonal projections of the fan-out wires in different layers on the base 100 are at least partially overlapped with each other, so that under the condition of a limited space of the fan-out area, more signal lines can be arranged, which is beneficial to achieving a narrower bezel. The interlayer insulation layer 200 is disposed between the first touch layer 10 and the second touch layer 20. The interlayer insulation layer 200 covers an entire surface of the base 100, and is shrink inwardly (by 75 μm-350 μm) at the edge and is hollowed out at the positions of the first connection vias 301, the second connection vias 302, the third connection vias 303 and the fourth connection vias 304.

In addition, the second connection vias 302, the third connection vias 303, and the fourth connection vias 304 are each located in the fan-out area. Therefore, the problem of shadow elimination caused by a large number of vias in the touch area can be effectively avoided. In an implementation of the present disclosure, the touch substrate further includes a ground signal line (not shown) in the peripheral area. The ground signal line may be located in the same layer as the first touch layer 10, or in the same layer as the second touch layer 20, which is not limited in the embodiments of the present disclosure. In the embodiment of the present disclosure, since the touch signal line 22 is disposed in the second touch layer 20, i.e., in the touch area, a narrow-bezel design can be implemented without increasing the thickness of the touch substrate. Further, in the embodiment of the present disclosure, the shielding electrode 30 is disposed between the touch signal line 22 and the sensing electrode 11, and with the shielding electrode 30, the interference between signals of the touch signal line 22 and the sensing electrode 11 can be avoided.

In a second aspect, an embodiment of the present disclosure provides a method for manufacturing a touch substrate, which may be used to manufacture any one of the touch substrates as described above. Specifically, in an embodiment of the present disclosure, the method may include the following steps S1 to S3.

At step S1, providing a base 100, and forming a pattern including a first touch layer 10 on the base 100 through a patterning process. The first touch layer 10 includes a plurality of sensing electrodes 11, a plurality of touch signal lines 22, and a plurality of shielding electrodes 30 arranged side by side along a row direction X. The sensing electrodes 11, the touch signal lines 22, and the shielding electrodes 30 each extend in a column direction Y.

It should be noted that the "patterning process" in the embodiments of the present disclosure refers to a technique for removing a part of a complete material layer to form a desired structure with the remaining part of the material layer, which generally includes one or more steps of forming a material layer, coating a photoresist, exposing, developing, etching, and stripping off the photoresist.

For example, the first touch layer 10 may be made of a metal material, for example, such as silver, aluminum, copper, molybdenum, niobium, or any alloy thereof, or the like. The step S1 may include forming a first metal conductive layer on the base 100 by, but not limited to, a sputtering process, coating a photoresist on the first metal conductive layer, and then forming the first touch layer 10 including a pattern having the sensing electrodes 11, the touch signal lines 22, and the shielding electrodes 30 by exposing, developing, etching, photoresist stripping, and the like.

In some implementations, the first touch layer 10 formed in the step S1 includes not only the sensing electrodes 11, the touch signal lines 22, and the shielding electrodes 30, but also a first redundant touch electrodes 40. The first redundant touch electrodes 40 are configured to disconnect the sensing electrodes 11, the touch signal lines 22, and the shielding electrodes 30 from each other. For example, the first touch layer 10 adopts a metal mesh structure, and in this case, the metal mesh structure between the sensing electrodes 11, the touch signal lines 22 and the shielding electrodes 30 are cut up to form the first redundant touch electrodes 40. In addition, in the step S1, not only the first touch layer 10 is formed, but also first fan-out wires 60 for providing signals for the sensing electrodes 11, and second signal sub-lines 802 of the third fan-out wires 80, are formed in the fan-out area of the touch substrate.

At step S2, forming, on the base 100 on which the step S1 is completed, an interlayer insulation layer 200, and forming first connection vias 301 through a patterning process. The first connection vias 301 are configured to connect driving electrodes 21 to be formed subsequently and touch signal lines 22 to be formed subsequently.

When second fan-out wires 70 and first signal sub-lines 801 of the third fan-out wires 80 are formed in the subsequent steps, second connection vias 302, third connection vias 303 and fourth connection vias 304 which penetrate through the interlayer insulation layer 200 are further formed in the step S2. The second connection vias 302 are configured to connect the subsequently formed second fan-out wires 70 to the touch signal line 22 to be formed subsequently, the third connection vias 303 are configured to connect the shielding electrodes with the first signal sub-lines 801 to be formed subsequently, and the fourth connection vias 304 are configured to connect the second signal sub-lines 802 to the first signal sub-lines 801 to be formed subsequently.

At step S3, forming, on the base 100 on which the step S2 is completed, a pattern including the second touch layer 20 through a patterning process. The second touch layer 20 includes a plurality of driving electrodes 21 arranged side by side along the column direction Y, each of the driving electrodes 21 extends in the row direction X.

For example, the second touch layer 20 may be made of a metal material, such as silver, aluminum, copper, molybdenum, niobium, or any alloy thereof, or the like. The step S3 may include forming a second metal conductive layer on the base 100 by, but not limited to, a sputtering process, coating a photoresist on the second metal conductive layer, and then forming the second touch layer 20 including a pattern having the driving electrodes 21 by exposing, developing, etching, photoresist stripping, and the like.

In some implementations, the second touch layer 20 formed in step S2 includes not only the driving electrodes 21, but also second redundant touch electrodes 50. The second redundant touch electrodes 50 are configured to disconnect every adjacent driving electrodes 21 from each other. In other words, the driving electrodes 21 and the second redundant touch electrodes 50 are alternately arranged, and disconnected from each other. For example, the second touch layer 20 adopts a metal mesh structure, and in this case, the metal mesh structure between every adjacent driving electrodes 21 are cut up to form the second redundant touch electrodes 50. In addition, in the step S2, not only the second touch layer 20 is formed, but also the second fan-out wires 70 for providing signals for the driving electrodes 21, and the first signal sub-lines 801 of the third fan-out wires 80, are formed in the fan-out area of the touch substrate. Each of the first signal sub-lines 801 has one end connected to the shielding electrode 30 through the third connection via 303 penetrating through the interlayer insulation layer 200, and another end connected to the second signal sub-line 802 through the fourth connection via 304 penetrating through the interlayer insulation layer 200. The second fan-out wires 70 are connected to the driving signal lines through the second connection vias 302 penetrating through the interlayer insulation layer 200.

So far, the manufacturing of the touch substrate according to the embodiment of the present disclosure is completed. Obviously, the method for manufacturing a touch substrate according to the embodiment of the present disclosure further includes other steps such as forming a ground electrode or other structures, which are not enumerated here.

Figure 17:
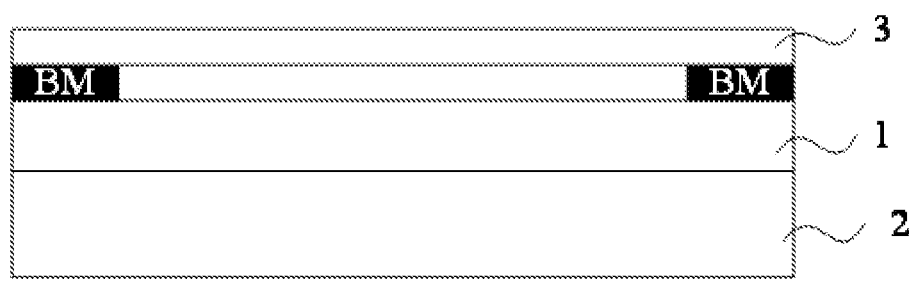
FIG. 17 is a schematic diagram of a display apparatus according to an embodiment of the present disclosure.

In a third aspect, FIG. 17 is a schematic diagram of a display apparatus according to an embodiment of the present disclosure. As shown in FIG. 17, an embodiment of the present disclosure provides a display apparatus, including a display panel 2, and any one of the touch substrates 1 as described above. In the embodiment of the present disclosure, since the display apparatus includes the touch substrate as described above, a narrow-bezel design can be implemented, and the interference between signals of the touch signal line 22 and the sensing electrode 11 can be avoided.

In some implementations, the display panel in the display apparatus may be a liquid crystal panel, an organic light-emitting display panel, an electronic paper, a mobile phone, a tablet, a television, a monitor, a laptop, a digital album, a navigator or any other product or component having a display function.

In some implementations, the display apparatus may be an out-cell touch screen. That is, the touch substrate is disposed on a display side of the display panel 2. Specifically, a first buffer layer may be formed on a display surface of the display panel 2, then the second touch layer 20 of the touch substrate 1 is disposed opposite to the first buffer layer, and a black matrix BM pattern is formed on the peripheral area of the base 100 of the touch substrate 1 to form a bezel of the touch screen, and finally a cover plate 3 is disposed opposite to the black matrix BM to form a complete structure of the touch screen.

Obviously, the display apparatus in the embodiments of the present disclosure may also have an in-cell touch screen structure. That is, the touch substrate is integrated in the display panel. The types of the display apparatus are not enumerated in the embodiments of the present disclosure.

It will be appreciated that the above implementations are merely exemplary implementations for the purpose of illustrating the principle of the present disclosure, and the present disclosure is not limited thereto. It will be apparent to one of ordinary skill in the art that various modifications and variations can be made to the present disclosure without departing from the spirit or essence of the present disclosure. Such modifications and variations should also be considered as falling into the protection scope of the present disclosure.

What is claimed is:

1. A touch substrate, comprising: a base, a first touch layer and a second touch layer on the base, and an interlayer insulation layer between the second touch layer and the first touch layer; wherein
    the first touch layer comprises a plurality of first touch electrodes and a plurality of touch signal lines arranged side by side along a first direction and extending in a second direction; and
    the second touch layer comprises a plurality of second touch electrodes arranged side by side along the second direction, each of the second touch electrodes extends in the first direction and is connected to at least one of the touch signal lines through a first connection via penetrating through the interlayer insulation layer; and wherein
    the first touch layer further comprises at least one shielding electrode extending in the second direction and arranged between at least part of the first touch electrodes and at least part of the touch signal lines, and wherein
    at least one shielding electrode is disposed between every two adjacent first touch electrodes; and
    each touch signal line comprises a first side and a second side opposite to each other in the first direction; and the shielding electrode is disposed between the first touch electrode and only one of the first side or the second side of the touch signal line.

2. The touch substrate according to claim 1, wherein one touch signal line is disposed between every two adjacent first touch electrodes.

3. The touch substrate according to claim 2, wherein the first touch layer further comprises: a plurality of first redundant touch electrodes arranged side by side along the first direction, each of which extends in the second direction; and the plurality of first redundant touch electrodes are located between at least adjacent two of the first touch electrodes, the touch signal lines, or the shielding electrode in the first touch layer.

4. The touch substrate according to claim 2, wherein the second touch layer further comprises a plurality of second redundant touch electrodes arranged side by side along the second direction, each second redundant touch electrode extends in the first direction, and is disposed between, and configured to disconnect, two adjacent second touch electrodes.

5. The touch substrate according to claim 2, wherein the touch substrate comprises a fan-out area; the base is further provided with first fan-out wires, second fan-out wires and a third fan-out wire in the fan-out area; the first fan-out wires are connected to the first touch electrodes, respectively; the second fan-out wires are connected to the touch signal lines, respectively; and the third fan-out wire is connected to the shielding electrode.

6. The touch substrate according to claim 5, wherein at least some of the first fan-out wire, the second fan-out wire, and the third fan-out wire are disposed in different layers, and/or at least one of the first fan-out wire, the second fan-out wire, or the third fan-out wire comprises portions in different layers.

7. The touch substrate according to claim 1, wherein the first touch layer further comprises: a plurality of first redundant touch electrodes arranged side by side along the first direction, each of which extends in the second direction; and the plurality of first redundant touch electrodes are located between at least adjacent two of the first touch electrodes, the touch signal lines, or the shielding electrode in the first touch layer.

8. The touch substrate according to claim 1, wherein the second touch layer further comprises a plurality of second redundant touch electrodes arranged side by side along the second direction, each second redundant touch electrode extends in the first direction, and is disposed between, and configured to disconnect, two adjacent second touch electrodes.

9. The touch substrate according to claim 1, wherein the touch substrate comprises a fan-out area; the base is further provided with first fan-out wires, second fan-out wires and a third fan-out wire in the fan-out area; the first fan-out wires are connected to the first touch electrodes, respectively; the second fan-out wires are connected to the touch signal lines, respectively; and the third fan-out wire is connected to the shielding electrode.

10. The touch substrate according to claim 9, wherein at least some of the first fan-out wire, the second fan-out wire, and the third fan-out wire are disposed in different layers, and/or at least one of the first fan-out wire, the second fan-out wire, or the third fan-out wire comprises portions in different layers.

11. The touch substrate according to claim 9, wherein a first one of the first fan-out wire, the second fan-out wire, or the third fan-out wire is located in the second touch layer, a second one of the first fan-out wire, the second fan-out wire, or the third fan-out wire is located in the first touch layer, and a third one of the first fan-out wire, the second fan-out wire, or the third fan-out wire comprises a first signal sub-line and a second signal sub-line electrically connected; one of the first signal sub-line or the second signal sub-line is located in the second touch layer, and the other of the first signal sub-line or the second signal sub-line is located in the first touch layer.

12. The touch substrate according to claim 11, wherein the first fan-out wire is located in the first touch layer;
the second fan-out wire is located in the second touch layer, and connected to the touch signal line through a second connection via penetrating through the interlayer insulation layer;
the third fan-out wire comprises the first signal sub-line and the second signal sub-line electrically connected; the first signal sub-line is located in the second touch layer, and the second signal sub-line is located in the first touch layer; and the first signal sub-line has one end connected to the shielding electrode through a third connection via penetrating through the interlayer insulation layer, and another end connected to the second signal sub-line through a fourth connection via penetrating through the interlayer insulation layer.

13. The touch substrate according to claim 12, wherein the second connection via, the third connection via, and the fourth connection via are each located in the fan-out area.

14. The touch substrate according to claim 1, wherein the shielding electrode comprises a ground electrode.

15. The touch substrate according to claim 1, wherein a connection line of at least some first connection vias intersects with the first direction.

16. The touch substrate according to claim 1, wherein at least one of the first touch layer or the second touch layer comprises a metal mesh touch structure.

17. A display apparatus, comprising the touch substrate according to claim 1.

18. A method for manufacturing a touch substrate, comprising:
forming a pattern comprising a first touch layer on a base through a patterning process; wherein the first touch layer comprises a plurality of first touch electrodes, a plurality of touch signal lines and at least one shielding electrode arranged side by side along a first direction; the plurality of first touch control electrodes and the plurality of touch signal lines both extend in a second direction; and the shielding electrode extends in the second direction;
forming an interlayer insulation layer and forming first connection vias in the interlayer insulation layer;
forming a pattern of a second touch layer through a patterning process; wherein the second touch layer comprises a plurality of second touch electrodes arranged side by side along the second direction, each of the second touch electrodes extends in the first direction, and the touch signal lines are connected to the second touch electrodes through the first connection vias penetrating through the interlayer insulation layer one to one; wherein the shielding electrode is disposed between at least one of the first touch electrodes and at least one of the touch signal lines, wherein
at least one shielding electrode is disposed between every two adjacent first touch electrodes; and
each touch signal line comprises a first side and a second side opposite to each other in the first direction; and the shielding electrode is disposed between the first touch electrode and only one of the first side or the second side of the touch signal line.

* * * * *